(12) United States Patent
Mantin et al.

(10) Patent No.: US 8,005,215 B2
(45) Date of Patent: Aug. 23, 2011

(54) TABLE SHUFFLE CIPHER SYSTEM

(75) Inventors: Itsik Mantin, Shoham (IL); Yaron Sella, Yehud (IL); Erez Waisbard, Or-Yehuda (IL)

(73) Assignee: NDS Limited, Staines, Middlesex (GB)

( * ) Notice: Subject to any disclaimer, the term of this patent is extended or adjusted under 35 U.S.C. 154(b) by 863 days.

(21) Appl. No.: 11/886,753

(22) PCT Filed: Mar. 9, 2006

(86) PCT No.: PCT/IL2006/000312
§ 371 (c)(1),
(2), (4) Date: Sep. 20, 2007

(87) PCT Pub. No.: WO2006/111950
PCT Pub. Date: Oct. 26, 2006

(65) Prior Publication Data
US 2008/0199004 A1 Aug. 21, 2008

(30) Foreign Application Priority Data
Apr. 20, 2005 (IL) .......................................... 168152
Sep. 6, 2005 (IL) .......................................... 170703

(51) Int. Cl.
*H04L 9/00* (2006.01)
(52) U.S. Cl. ................. 380/46; 380/27; 380/28; 380/37; 380/42; 380/47; 380/269; 713/176; 713/189; 331/78; 370/344; 375/132; 708/250; 708/255
(58) Field of Classification Search ..................... 380/42
See application file for complete search history.

(56) References Cited

U.S. PATENT DOCUMENTS

| | | | |
|---|---|---|---|
| 5,297,207 A * | 3/1994 | Degele | 380/46 |
| 6,785,389 B1 | 8/2004 | Sella et al. | |
| 2002/0176572 A1 | 11/2002 | Ananth | |
| 2004/0086117 A1 | 5/2004 | Petersen et al. | |

FOREIGN PATENT DOCUMENTS
WO  WO 00/254756  5/2000

OTHER PUBLICATIONS

Alex Biryukov et al.; "Real Time Cryptanalysis of A5/1 on a PC" (Apr. 2000); available on the World Wide Web at: http://cryptome.orq/a51-bsw.htm.

(Continued)

*Primary Examiner* — Nathan Flynn
*Assistant Examiner* — Bryan Wright
(74) *Attorney, Agent, or Firm* — Husch Blackwell LLP

(57) ABSTRACT

A system including a pseudo-random number generator having a register to store an extended state having a reduced state and a dynamic constant, an initialization module to initialize a part of the extended state based on a Key and/or an Initial Value, a state update module to update the reduced state, an output word module to generate output words, the state update module and the output word module being adapted to operate through cyclical rounds, each round including updating the reduced state and then generating one of the output words, and an update dynamic constant module to update the dynamic constant, wherein in a majority of the rounds, updating of the reduced state and/or generation of the output word is based on the dynamic constant, and the dynamic constant is only updated in a minority of the rounds. Related apparatus and method are also described.

7 Claims, 2 Drawing Sheets

OTHER PUBLICATIONS

Lars R. Knudsen et al.; "Analysis Methods for (Alleged) RC4", *Advances in Crypytology—ASIACRYPT 1998, Lecture Notes in Computer Science 1514* (Springer-Verlag, 1998, pp. 327-341); available on the World Wide Web at: http://www.cosic.esat.kuleuven.be/publications/article-68.pdf.

A. Menezes et al.; *Handbook of Applied Cryptology* (CRC Press, Inc., 1997, pp. 213-222).

Souradyuti Paul et al.; "A New Weakness in the RC4 Keystream Generator and an Approach to Improve the Security of the Cipher", Fast Software Encryption, FSE 2004, Lecture Notes in Computer Science (Springer-Verlag, 2004, pp. 245-259); found on the World Wide Web at: http://www.cosic.esat.kuleuven.be/publications/article-40.pdf.

Bartosz Zoltak; VMPC One—Way Function and Stream Cipher (IACR, Feb. 2004); available on the World Wide Web at: http://www.vmpcfunction.com/vmpc.pdf.

*Applied Cryptology* (2d ed., pp. 397-398).

Dec. 21, 2009 Supplementary European Search Report in connection with EP 06 711294.6.

\* cited by examiner

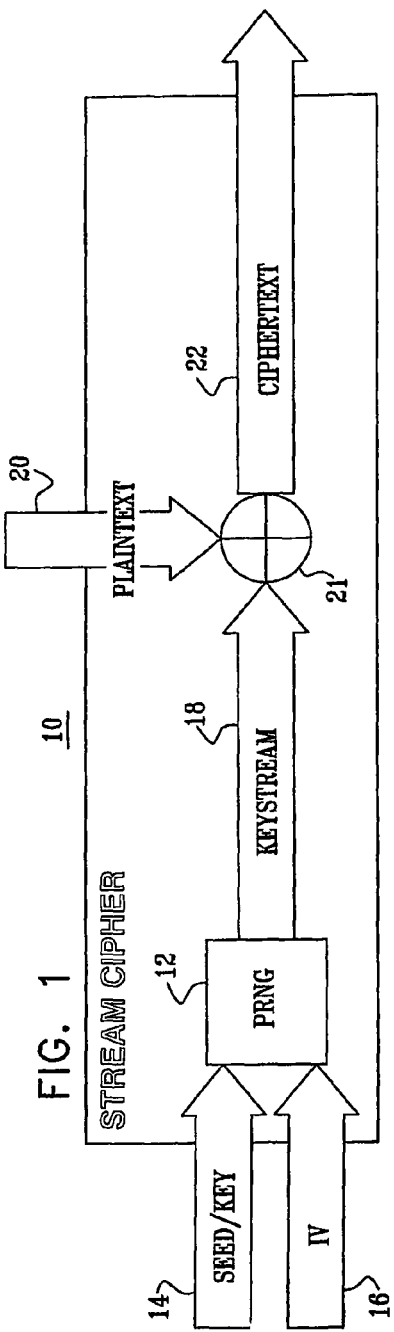
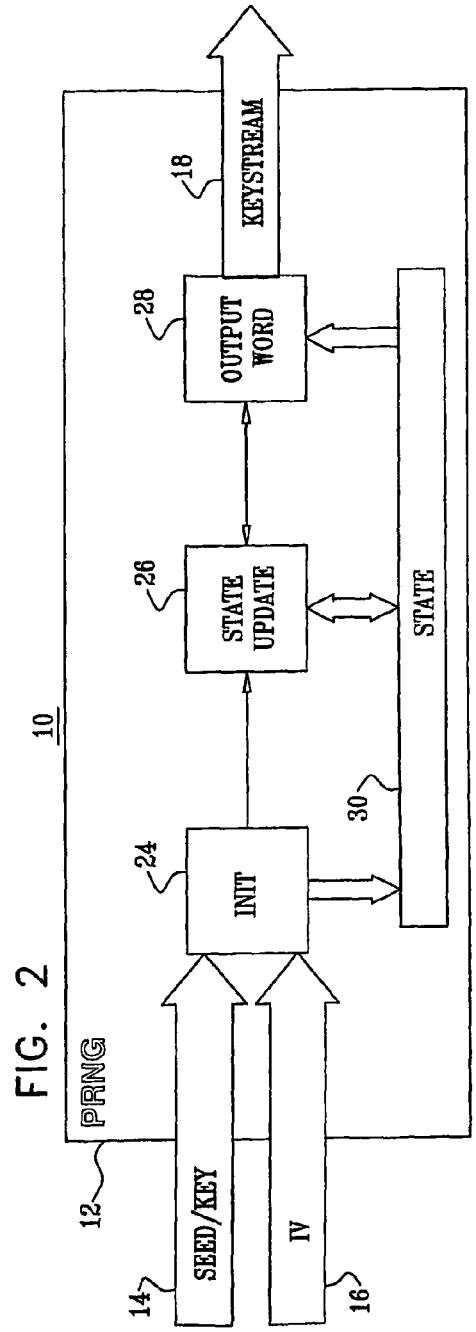

TABLE SHUFFLE CIPHER SYSTEM

The present application is a 35 USC §371 application of PCT/IL2006/000312, filed on 9 Mar. 2006 and entitled "Improved Cipher System", which was published on 26 Oct. 2006 in the English language with International Publication Number WO 2006/111950, and which relies for priority on Israel Patent Application No. 168152, filed on 20 Apr. 2005 and Israel Patent Application No. 170703, filed on 6 Sep. 2005.

FIELD OF THE INVENTION

The present invention relates to stream ciphers and in particular it relates to pseudo-random number generators for use with stream ciphers.

BACKGROUND OF THE INVENTION

A stream cipher is a system for encryption and decryption of digital data.

Reference is now made to FIG. 1, which is a stream cipher 10. The stream cipher 10 usually employs a pseudo-random number generator 12 (PRNG) in the following way. The pseudo-random number generator 12 is typically fed with a key 14 (K) and an initial value 16 (IV) and generally derives there from a keystream 18 (KS) of arbitrary length. The encryption of a plaintext 20 is typically the result of an exclusive-OR (XOR) operation, performed by a combiner 21, on the plaintext 20 and a corresponding prefix of the keystream 18 thus providing ciphertext 22. Similarly, the decryption of the ciphertext 22 is typically the result of an XOR operation when performed on the ciphertext 22 and a corresponding prefix of the keystream 18 thus providing the plaintext 20. The combiner 21 has been described herein as an XOR combiner. However, it will be appreciated by those ordinarily skilled in the art that other suitable combiners can be used, for example, but not limited to, an additive combiner.

Reference is now made to FIG. 2, which is a detailed view of pseudo-random number generator 12 of the stream cipher 10 of FIG. 1. Many stream ciphers are based on a secret internal state 30 and on three modules. The three modules typically include an initialization module 24, a state update module 26 and an output word module 28. The initialization module 24 is typically used at initialization for translating the IV 16 and the key 14 into an initial state. Then, the cipher 10 generally enters a loop where the state update module 26 updates the state 30 and the output word module 28 uses the updated state 30 to output a next word of the keystream 18. The cipher 10 preferably continues performing the loop until a sufficiently long keystream 18 is emitted.

The output word is typically a bit (as in LFSR-based stream ciphers), a byte (as in RC4), or a block of any length. Stream ciphers are also known as state ciphers, since they usually maintain an internal state.

In some cases the initialization module 24 takes as input only the key 14 (K), whereas in other cases the initialization module 24 takes as input the key 14 (K) and the IV 16.

Some known stream ciphers are:

"RC4", described in more detail in "Analysis methods for (Alleged) RC4" by Lars R. Knudsen, Willi Meier, Bart Preneel, Vincent Rijmen and Sven Verdoolaege of the Department of Informatics, University of Bergen, Bergen also available at www.cosic.esat.kuleuven.be/publications/article-68.pdf;

"RC4A", described in more detail in "A New Weakness in the RC4 Keystream Generator and an Approach to Improve the Security of the Cipher," in Fast Software Encryption, FSE 2004, Lecture Notes in Computer Science 3017, Bimal Roy, Willi Meier (Eds.), Springer-Verlag, 2004, pp. 245-259, available via www.esat.kuleuven.be/~psourady/papers.html;

"VMPC", described in more detail in "VMPC One-Way Function and Stream Cipher" by Bartosz Zoltak presented at FSE '04, Delhi, India, 5-7 Feb. 2004, available at www.vmpc-function.com/vmpc.pdf;

"SEAL", described in more detail in "Handbook of Applied Cryptography" by Alfred J. Menezes, Paul C. van Oorschot and Scott A. Vanstone, published by CRC Press; and "A5/1", described in more detail in "Real Time Cryptanalysis of A5/1 on a PC" by Alex Biryukov, Adi Shamir and David Wagner presented at the FSE Workshop 2000, Apr. 10-12, 2000, New York, N.Y. USA, available at cryptome.org/a51-bsw.htm.

A table-shuffle stream cipher is a stream cipher generally having a certain structure of the state 30 and the state update module 26. In a table-shuffle stream cipher, the pseudo-random number generator 12 preferably maintains the state 30 including a stream cipher table of size N. The contents of the table are typically numbered between zero and N−1, permuted in some order. The main part of the secrecy of the state resides in the permutation. In addition, the table generally comprises a set of indices for the table, namely numbers between 0 and N−1 inclusive. The indices are typically divided into traversal indices and pseudo-random indices, differing in the way they are updated by the state update module 26.

The state update module 26 of a table-shuffle stream) cipher preferably updates pseudo-random indices in a way that depends on the order of the values in the table, and updates traversal indices in a way that is independent of the order of the values in the table when the update takes place. The values in the table entries that are pointed to by the indices are referred to as the "refresh set". The state update module 26 preferably updates the table by permuting the values in the refresh set, namely values in the refresh set may change places with other values in the refresh set.

The state 30 of a table-shuffle stream cipher may comprise several tables with equal or different sizes. In that case, every index typically points to one or more tables and the refresh set can include values from several tables. In most of the cases the state update module 26 generally only moves values inside the tables, but does not move values between the tables.

The following is an example according to the RC4 stream cipher system, which operates with one table of 256 entries, one traversal index, i, and one pseudo-random index, j. To generate an output word, the following is preferably performed.

First, a state update is preferably performed by performing the following two updates:

$$i=(i+1) \bmod 256 \qquad \text{(Equation 1), and}$$

$$j=(j+S[i]) \bmod 256 \qquad \text{(Equation 2),}$$

where S[x] is the value in the $x^{th}$ location of the table.

S[i] and S[j] are the refresh set of the state update module 26,

Then S[i] and S[j] are typically swapped with each other.

Therefore, the state update generally takes an input state and provides a (usually slightly) different output state.

Next, the output word module 28 preferably performs the following on the state 30:

$$t=(S[i]+S[j]) \bmod 256 \qquad \text{(Equation 3),}$$

determine S[t] as the output word.

In other words the calculation of the output word can be represented by:

$$S[(S[i]+S[j])] \mod 256]$$ (Equation 4).

Table-shuffle stream ciphers (including RC4) are described in more detail with reference to Applied Cryptography by Bruce Schneier, published by John Wiley & Sons, Inc. in 1996 page 397-398.

Patents in the related art include U.S. Pat. No. 6,785,389 to Sella, et al.

The disclosures of all references mentioned above and throughout the present specification, as well as the disclosures of all references mentioned in those references, are hereby incorporated herein by reference.

SUMMARY OF THE INVENTION

The present invention seeks to provide an improved stream cipher.

The system and method of the present invention, in preferred embodiments thereof, apart from providing an improved stream cipher, typically lends itself to strengthening other known cipher systems and methods.

The system of the present invention, in preferred embodiments thereof, includes an improved stream cipher employing at least one dynamic constant for updating the state and/or producing an output word, and/or initializing the extended state, and/or updating the dynamic constants. The dynamic constant(s) are only updated after a minority of the state update/output word generation rounds. In accordance with a preferred embodiment, a table-shuffle stream cipher system is described.

There is thus provided in accordance with a preferred embodiment of the present invention a system including a pseudo-random number generator including a register to store an extended state, the extended state having a reduced state and at least one dynamic constant, an initialization module to initialize at least part of the extended state based on at least one of a Key and an Initial Value, a state update module to update the reduced state, an output word module to generate a plurality of output words, wherein the state update module and the output word module are adapted to operate through a plurality of cyclical rounds, each of the rounds including updating the reduced state by the state update module and then generating one of the output words by the output word module, and an update dynamic constant module to update the at least one dynamic constant, wherein in a majority of the rounds, at least one of updating of the reduced state and the generation of the output word is based on the at least one dynamic constant, and the at least one dynamic constant is only updated in a minority of the rounds.

Further in accordance with a preferred embodiment of the present invention, the system includes a combiner, the output words forming a key stream, the combiner being adapted to convert between plaintext and ciphertext based on the key stream.

Still further in accordance with a preferred embodiment of the present invention the combiner is an encryption combiner to convert from plaintext to ciphertext based on the key stream.

Additionally in accordance with a preferred embodiment of the present invention the combiner is a decryption combiner to convert from ciphertext to plaintext based on the key stream.

Moreover in accordance with a preferred embodiment of the present invention the update dynamic constant module is adapted to update the at least one dynamic constant such that a new value of the dynamic constant is at least biased away from at least one undesirable value.

Further in accordance with a preferred embodiment of the present invention the new value is determined to exclude the at least one undesirable value.

Still further in accordance with a preferred embodiment of the present invention when the at least one dynamic constant is used as a multiplier, the at least one undesirable value includes zero.

Additionally in accordance with a preferred embodiment of the present invention the at least one dynamic constant includes two dynamic constants, and when a sum of the two dynamic constants is used as a multiplier, the at least one undesirable value is chosen such that the sum of the two dynamic constants is not equal to zero.

Moreover in accordance with a preferred embodiment of the present invention the update dynamic constant module is adapted to update the at least one dynamic constant as a function of the extended state.

Further in accordance with a preferred embodiment of the present invention the update dynamic constant module is adapted to update the at least one dynamic constant as a function of the at least one dynamic constant.

Still further in accordance with a preferred embodiment of the present invention the update dynamic constant module is adapted to update the at least one dynamic constant when a condition is satisfied in the reduced state.

Additionally in accordance with a preferred embodiment of the present invention the state update module is adapted to XOR a temporal result of the update of the reduced state with the at least one dynamic constant.

Moreover in accordance with a preferred embodiment of the present invention the state update module is adapted to add the at least one dynamic constant to a temporal result of the update of the reduced state.

Further in accordance with a preferred embodiment of the present invention the state update module is adapted to subtract the at least one dynamic constant from a temporal result of the update of the reduced state.

Still further in accordance with a preferred embodiment of the present invention the state update module is adapted to multiply the at least one dynamic constant with a temporal result of the update of the reduced state.

Additionally in accordance with a preferred embodiment of the present invention the state update module is adapted to update the reduced state by determining a new value of the reduced state such that the new value is at least biased away from at least one undesirable value.

Moreover in accordance with a preferred embodiment of the present invention the state update module is adapted to determine the new value such that the new value excludes the at least one undesirable value.

Further in accordance with a preferred embodiment of the present invention the reduced state includes a table of a size N, at least one traversal index and at least one pseudo-random index, the state update module being adapted to update the at least one traversal index as a function of the at least one dynamic constant.

Still further in accordance with a preferred embodiment of the present invention the update dynamic constant module is adapted to update the at least one dynamic constant every N of the rounds.

Additionally in accordance with a preferred embodiment of the present invention the state update module is adapted to update the at least one traversal index by adding, or subtracting, the at least one dynamic constant to, or from, the at least one traversal index, respectively.

Moreover in accordance with a preferred embodiment of the present invention the at least one dynamic constant is an integer which is determined such that the at least one dynamic constant equals N divided by the sum of b and C, wherein a greatest common divisor of the at least one dynamic constant and N is 1, b is less than 5 and is a positive divider of N, and C is one of less than 5 or greater than N−5.

Further in accordance with a preferred embodiment of the present invention the reduced state includes a table of a size N, at least one pseudo-random index and at least one traversal index, the state update module being adapted to update the at least one pseudo-random index as a function of the at least one dynamic constant.

Still further in accordance with a preferred embodiment of the present invention the at least one dynamic constant is in the range of zero to N−1.

Additionally in accordance with a preferred embodiment of the present invention the state update module is adapted to XOR a temporal result of the update of the at least one pseudo-random index with the at least one dynamic constant.

Moreover in accordance with a preferred embodiment of the present invention the state update module is adapted to add the at least one dynamic constant to a temporal result of the update of the at least one pseudo random index.

Further in accordance with a preferred embodiment of the present invention the state update module is adapted to subtract the at least one dynamic constant from a temporal result of the update of the at least one pseudo random index.

Still further in accordance with a preferred embodiment of the present invention the state update module is adapted to multiply the at least one dynamic constant with a temporal result of the update of the at least one pseudo random index.

Additionally in accordance with a preferred embodiment of the present invention the state update module is adapted to update the reduced state by determining a new value of the at least one pseudo-random index such that the new value is at least biased away from at least one undesirable value of the pseudo-random index.

Moreover in accordance with a preferred embodiment of the present invention the state update module is adapted to determine the new value such that the new value excludes the at least one undesirable value of the pseudo-random index.

Further in accordance with a preferred embodiment of the present invention the at least one undesirable value is a number between 0 and 5.

Still further in accordance with a preferred embodiment of the present invention the at least one undesirable value is a number between N−5 and N−1.

Additionally in accordance with a preferred embodiment of the present invention the at least one undesirable value is a number which is greater than N/5, and the at least one undesirable value and N have a common divisor.

Moreover in accordance with a preferred embodiment of the present invention the reduced state includes a table of a size N, at least one pseudo-random index and at least one traversal index, the output word module being adapted to generate the one output word as a function of the at least one dynamic constant.

Further in accordance with a preferred embodiment of the present invention the at least one dynamic constant is in the range of zero to N−1.

Still further in accordance with a preferred embodiment of the present invention the output word module is adapted to XOR a temporal result of the generation of the one output word with the at least one dynamic constant.

Additionally in accordance with a preferred embodiment of the present invention the output word module is adapted to add the at least one dynamic constant to a temporal result of the generation of the one output word.

Moreover in accordance with a preferred embodiment of the present invention the output word module is adapted to subtract the at least one dynamic constant from a temporal result of the generation of the one output word.

Further in accordance with a preferred embodiment of the present invention the output word module is adapted to multiply the at least one dynamic constant with a temporal result of the generation of the one output word.

Still further in accordance with a preferred embodiment of the present invention the initialization module is adapted to initialize the at least part of the extended state as a function of the at least one dynamic constant.

Additionally in accordance with a preferred embodiment of the present invention the reduced state includes a table of a size N having a plurality of entries and a plurality of indices, the initialization module being adapted to initialize the extended state by an initialization process that includes two nested loops having an external loop and an internal loop, the external loop being repeated C1 times, the internal loop being repeated C2 times, a total number of iterations of the initialization process being at least the size of the table such that C1 multiplied by C2 is at least equal to N, the at least one dynamic constant being updated in the external loop, at least one of the entries being updated in the internal loop as a function of the at least one dynamic constant updated in the external loop.

Moreover in accordance with a preferred embodiment of the present invention the at least one entry updated in the internal loop is updated as a function of the Key, at least one of the indices, and at least one of the entries.

Further in accordance with a preferred embodiment of the present invention the at least one dynamic constant updated in the external loop is updated as a function of the Initial Value and a minimum of N and C2 multiplied by a current number of iterations made by the external loop.

There is also provided in accordance with another preferred embodiment of the present invention a system including a register to store an extended state, the extended state having a reduced state and at least one dynamic constant, an initialization module to initialize at least part of the extended state based on at least one of a Key and an Initial Value, a state update module to update the reduced state, an output word module to generate a plurality of output words, the output words forming a keystream, a combiner to convert between plaintext and ciphertext based on the key stream, wherein the state update module, the output word module and the combiner are adapted to operate through a plurality of cyclical rounds, each of the rounds including updating the reduced state by the state update module, then generating one of the output words by the output word module and then combining the output word with one of the plaintext and the ciphertext by the combiner, and an update dynamic constant module to update the at least one dynamic constant, wherein in a majority of the rounds, the combining of the output word is based on the at least one dynamic constant, and the at least one dynamic constant is only updated in a minority of the rounds.

Still further in accordance with a preferred embodiment of the present invention the combiner is an encryption combiner to convert from the plaintext to the ciphertext based on the key stream.

Additionally in accordance with a preferred embodiment of the present invention the combiner is a decryption combiner to convert from the ciphertext to the plaintext based on the key stream.

Moreover in accordance with a preferred embodiment of the present invention the update dynamic constant module is adapted to update the at least one dynamic constant such that a new value of the dynamic constant is at least biased away from at least one undesirable value.

Further in accordance with a preferred embodiment of the present invention the new value is determined to exclude the at least one undesirable value.

Still further in accordance with a preferred embodiment of the present invention when the at least one dynamic constant is used as a multiplier, the at least one undesirable value includes zero.

Additionally in accordance with a preferred embodiment of the present invention the at least one dynamic constant includes two dynamic constants, and when a sum of the two dynamic constants is used as a multiplier, the at least one undesirable value is chosen such that the sum of the two dynamic constants is not equal to zero.

Moreover in accordance with a preferred embodiment of the present invention the update dynamic constant module is adapted to update the at least one dynamic constant as a function of the extended state.

Further in accordance with a preferred embodiment of the present invention the update dynamic constant module is adapted to update the at least one dynamic constant as a function of the at least one dynamic constant.

Still further in accordance with a preferred embodiment of the present invention the update dynamic constant module is adapted to update the at least one dynamic constant when a condition is satisfied in the reduced state.

Additionally in accordance with a preferred embodiment of the present invention the initialization module is adapted to initialize the at least part of the extended state as a function of the at least one dynamic constant.

There is also provided in accordance with still another preferred embodiment of the present invention a table-shuffle stream cipher system including a pseudo-random number generator adapted to maintain at least one stream cipher table having N entries, at least one traversal index and at least one pseudo-random index, a state update module adapted to update a state of the table by determining a new value of the traversal index such that the new value of the traversal index is a function of a constant integer having an absolute value greater than one, the new value of the traversal index being independent of the pseudo-random index and the entries of the table, determining a new value of the pseudo random index based upon at least one of the entries, and swapping the entry associated with the new value of the traversal index with the entry associated with the new value of the pseudo-random index, and an output word module adapted to generate an output word as a function of the new value of the traversal index and the new value of the pseudo-random index.

Moreover in accordance with a preferred embodiment of the present invention the state update module is adapted to update the at least one traversal index by adding, or subtracting, the constant to, or from, the at least one traversal index, respectively.

Further in accordance with a preferred embodiment of the present invention the constant is an integer which is determined such that the constant equals N divided by the sum of b and C, wherein a greatest common divisor of the at least one dynamic constant and N is 1, b is less than 5 and is a positive divider of N, and C is one of less than 5 or greater than N−5.

There is also provided in accordance with still another preferred embodiment of the present invention a table-shuffle stream cipher system including a pseudo-random number generator adapted to maintain at least one stream cipher table having N entries, one traversal index and at least one pseudo-random index, a state update module adapted to update a state of the table by determining a new value of the traversal index, the new value of the traversal index being independent of the pseudo-random index and the entries of the table, determining a new value of the pseudo-random index based upon at least one of the entries such that the new value of the pseudo-random index is at least biased away from at least one undesirable value of the N possible values of the pseudo-random index, and swapping the entry associated with the new value of the traversal index with the entry associated with the new value of the pseudo-random index, and an output word module adapted to generate an output word as a function of the new value of the traversal index and the new value of the pseudo-random index.

Still further in accordance with a preferred embodiment of the present invention the state update module is adapted to determine the new value of the pseudo-random index excludes the at least one undesirable value.

There is also provided in accordance with still another preferred embodiment of the present invention a method for generating pseudo random numbers, including providing a register to store an extended state, the extended state having a reduced state and at least one dynamic constant, initializing at least part of the extended state based on at least one of a Key and an Initial Value, updating the reduced state and generating a plurality of output words through a plurality of cyclical rounds, wherein in a majority of the rounds, at least one of the updating of the reduced state and the generating of the output words is based on the at least one dynamic constant, and updating the at least one dynamic constant, wherein the at least one dynamic constant is only updated in a minority of the rounds.

There is also provided in accordance with still another preferred embodiment of the present invention a method for encrypting/decrypting data, including providing a register to store an extended state, the extended state having a reduced state and at least one dynamic constant, initializing at least part of the extended state based on at least one of a Key and an Initial Value, updating the reduced state, generating a plurality of output words, the output words forming a keystream, converting between plaintext and ciphertext based on the key stream, wherein the updating, the generating and the combining are performed through a plurality of cyclical rounds such that each of the rounds includes updating the reduced state, then generating one of the output words and then combining the output word with one of the plaintext and the ciphertext by the combiner, and in a majority of the rounds, the combining of the output word is based on the at least one dynamic constant, and updating the at least one dynamic constant, wherein the at least one dynamic constant is only updated in a minority of the rounds.

There is also provided in accordance with still another preferred embodiment of the present invention a method for operating a table-shuffle stream cipher including maintaining at least one stream cipher table having N entries, at least one traversal index and at least one pseudo-random index, updating a state of the table by determining a new value of the traversal index such that the new value of the traversal index is a function of a constant having an absolute value greater than one, the new value of the traversal index being independent of the pseudo-random index and the entries of the table, determining a new value of the pseudo random index based upon at least one of the entries, and swapping the entry associated with the new value of the traversal index with the entry associated with the new value of the pseudo-random index, and generating an output word as a function of the new value of the traversal index and the new value of the pseudo-random index.

There is also provided in accordance with still another preferred embodiment of the present invention a method for operating a table-shuffle stream cipher including maintaining at least one stream cipher table having N entries, one traversal index and at least one pseudo-random index, updating a state of the table by determining a new value of the traversal index, the new value of the traversal index being independent of the pseudo-random index and the entries of the table, determining a new value of the pseudo-random index based upon at least one of the entries such that the new value of the pseudo-random index is at least biased away from at least one undesirable value of the N possible values of the pseudo-random index, and swapping the entry associated with the new value of the traversal index with the entry associated with the new value of the pseudo-random index, and generating an output word as a function of the new value of the traversal index and the new value of the pseudo-random index.

BRIEF DESCRIPTION OF THE DRAWINGS

The present invention will be understood and appreciated more fully from the following detailed description, taken in conjunction with the drawings in which:

FIG. 1 is a stream cipher system;

FIG. 2 is a detailed view of a PRNG of the stream cipher system of FIG. 1; and

DETAILED DESCRIPTION OF A PREFERRED EMBODIMENT

Figure 3:
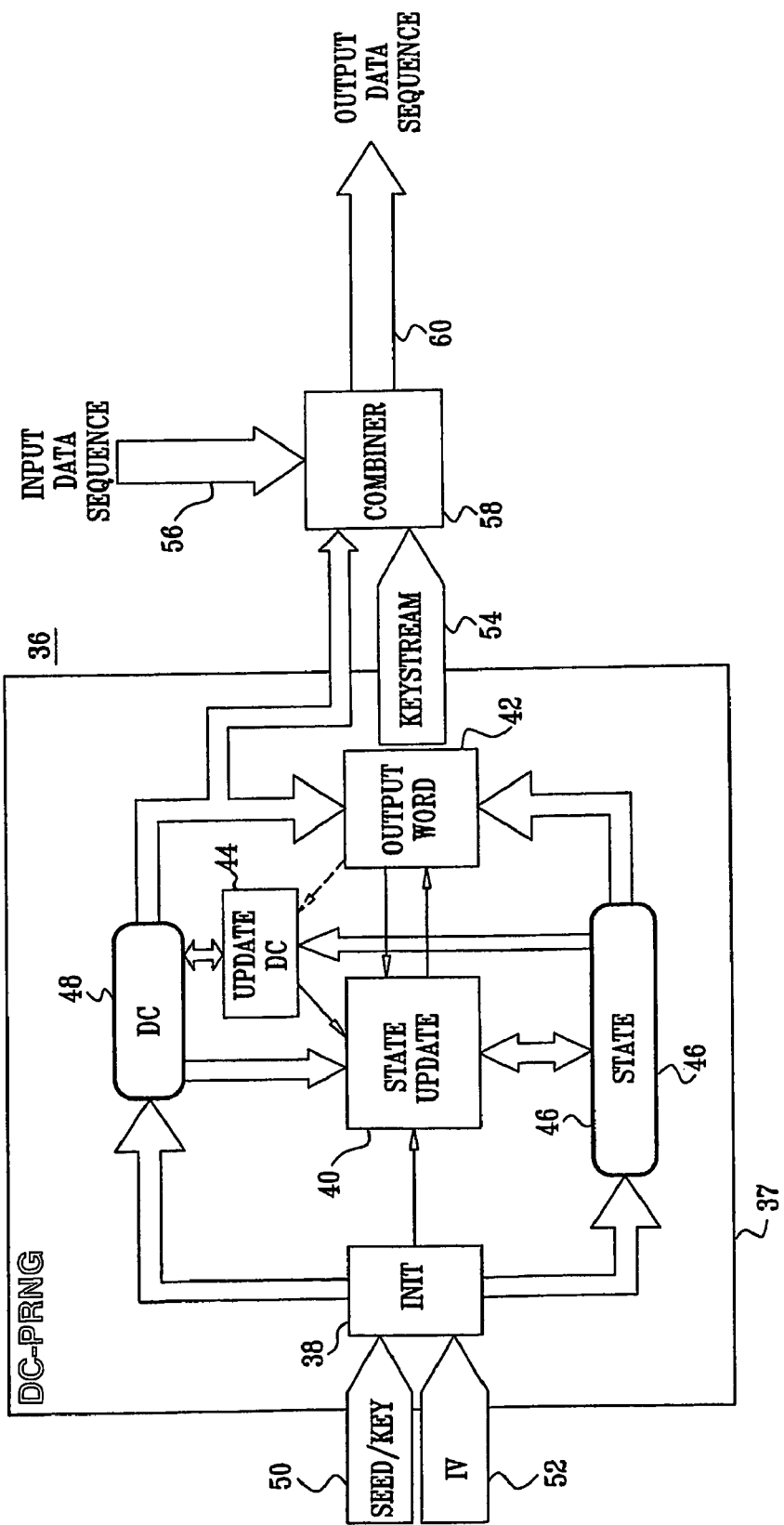
FIG. 3 is a stream cipher system constructed and operative in accordance with a preferred embodiment of the present invention.

Reference is now made to FIG. 3, which is a stream cipher 36 constructed and operable in accordance with a preferred embodiment of the present invention.

The stream cipher 36 typically includes a pseudo-random number generator 37 and a combiner 58. The pseudo-random number generator 37 preferably has an initialization module 38, a state update module 40, an output word module 42 and an update dynamic constant (DC) module 44.

The stream cipher 36 typically includes a register to store a state 46 and one or more dynamic constants 48 (DCs). The state 46 without the DCs 48 is generally referred to herein as a "reduced state". The state 46 together with the DCs 48 is generally referred to herein as an "extended state".

In FIG. 3, white rectangles represent modules (for performing a process) and pentagons and rounded rectangles represent data. Thin arrows represent passing control from one module to another. Thick arrows represent the affect of a module on data, or a data on a module. For example, the DC update module 44 preferably affects the DC 48 and the update DC module 44 is preferably affected by the DC 48. By way of another example, the state update module 40 preferably affects the state 46 and is preferably affected by the 48 and the state 46.

The state update module 40 is generally adapted to update the reduced state. The output word module 42 is generally adapted to generate a plurality of output words thereby forming a keystream 54. The combiner 58 is generally adapted to convert from an input data sequence 56 to an output data sequence 60 based on the keystream 54. The state update module 40, the output word module 42 and the combiner 58 are preferably adapted to operate through a plurality of cyclical rounds. Each of the rounds typically includes updating the reduced state by the state update module 40, then preferably generating one output word by the output word module 42 and then combining the generated output word with one or more bits of the input data sequence 56 by the combiner 58.

When the input data sequence 56 is plaintext, the combiner 58 is an encryption combiner and the output data sequence 60 is ciphertext. Therefore, the encryption combiner converts from plaintext to ciphertext based on the keystream 54. The encryption combiner performs a function that is invertible in one of its parameters. In other words, for the function f there exists an inverse F such that for every X and Y, F(X, f(X, Y))=Y.

Conversely, when the input data sequence 56 is ciphertext, the combiner 58 is a decryption combiner and the output data sequence 60 is plaintext Therefore, the decryption combiner converts from ciphertext to plaintext based on the keystream 54. The decryption combiner performs a function which is the inverse of the function performed by the encryption combiner.

The combiner 58 is preferably an XOR combiner. However, it will be appreciated by those ordinarily skilled in the art that other suitable combiners can be used, for example, but not limited to, an additive combiner.

A dynamic constant is a parameter that preferably has the following properties. First, in a majority (typically over 50%, preferably between 80% and 100%) of rounds, the updating of the reduced state by the state update module 40, and/or the generation of the output words by the output word module 42, and/or the combining the output words with plaintext/ciphertext, is based on one or more of the dynamic constants 48. Second, in a majority (typically over 50%, preferably between 80% and 100%) of the rounds the dynamic constant(s) 48 used in the updating of the reduced state, and/or the generation of the output words, and/or the combining the output words with plaintext/ciphertext, are unchanged. In other words, in a minority (typically up to 50%, preferably between 0% and 20%) of the rounds the DCs 48 used in the updating of the reduced state, and/or the generation of the output words, and/or the combining the output words with plaintext/ciphertext, are updated.

The dynamic constant 48 optionally has one or more "undesirable" or "forbidden" values, either separately (for example, but not limited to, a dynamic constant that is used as a multiplier has an undesirable value including zero) or in combination (for example, but not limited to, when the sum of two DCs 48 is used as a multiplier, the undesirable value(s) is chosen such that the sum does not equal zero).

Therefore, the update DC module 44 is preferably adapted to update the DC 48 such that a new value of the DC 48 is at least biased away from one or more undesirable values. Preferably, the new value of the DC 48 is determined to exclude the undesirable value(s).

When one or more dynamic constants have forbidden values, separately or in combination, the update DC module 44 preferably avoids the forbidden values. For example, the update DC module 44 checks after the update that the new values of the dynamic constants are not forbidden and re-updates the DC(s) 48 if the new values are forbidden.

In accordance with a preferred embodiment of the present invention the update DC module 44 generally uses the state 46 and the DCs 48 (in other words the extended state) to update the DCs 48.

The initialization module 38 typically initializes the extended state which includes the DCs 48 and the state 46. In accordance with the most preferred embodiment of the present invention, the DCs 48 are preferably initialized to pseudo-random values based on a key 50 and/or an IV 52.

The state update module 40 preferably uses one or more of the DCs 48 as constants in order to update the state 46. The state update module preferably does not update the DCs 48.

The output word module 42 preferably uses one or more of the DCs 48 as constants in order to produce an output word. The output word module 42 preferably does not update the DCs 48.

The combiner 58 preferably uses one or more of the DCs 48 as constants in order to combine the keystream 54 with plaintext/ciphertext, as appropriate. The combiner 58 preferably does not update the DCs 48.

After a certain number of rounds of updating the state 46, producing the output words, and combining the output words with plaintext/ciphertext, the update DC module 44 is preferably invoked in order to update the DC(s) 48.

Additionally or alternatively, once a certain condition is satisfied in the internal state 46, the update DC module 44 is generally invoked in order to update the DC 48.

Preferred times of when to invoke the update DC module 44 are: after a certain number of rounds, for example, but not limited to, after 256 rounds; and/or when a certain condition on the state 46 is satisfied, for example, but not limited to, when the lowest 4 bits of a certain byte of the state 46 are 1111.

It will be appreciated by those ordinarily skilled in the art that the system of the stream cipher 36 can be applied to any suitable stream cipher, for example, but not limited to a table-shuffle stream cipher, which is now described below.

The table-shuffle stream cipher of the present invention generally includes many of the features of the stream cipher 36 and is therefore also described with reference to FIG. 3 as an exemplary embodiment of the stream cipher 36. It will be appreciated by those ordinarily skilled in the art that many of the features described below with reference to a table-shuffle stream cipher are applicable to other suitable stream ciphers.

The pseudo-random number generator 37 of the table-shuffle stream cipher 36 is generally adapted to maintain the state 46 having at least one stream cipher table having N entries, one or more traversal indices and one or more pseudo-random indices.

The state update module 40 of the table-shuffle stream cipher 36 is now described in more detail.

First the update of the traversal indices is described, then the update of the pseudo-random indices is described, and then the update of the rest of the state 46 is described.

Updating of the traversal indices is now described in more detail.

The state update module 40 generally updates each of the traversal indices, i, by performing the following function:

$$i = f(i,D) \bmod N \qquad \text{(Equation 5)},$$

where D is constant, preferably one of the dynamic constants 48, and N is the size of the table to which the traversal index points.

Therefore, the state update module 40 is typically adapted to update (in other words determine a new value of) the traversal index as a function of a constant, preferably one or more of the dynamic constants 48. When the constant is a fixed constant, the constant is preferably an integer greater than one.

The new value of the traversal index is generally independent of any pseudo-random indices and the entries of the table of state 46.

In accordance with a preferred embodiment of the present invention, D is generally in the range of zero to N−1.

In accordance with the most preferred embodiment of the present invention, the update DC module 44 is typically adapted to update D (one of the dynamic constant 48) every N rounds.

In accordance with the most preferred embodiment of the present invention, f is generally defined as:

$$f(i,D) = (i+D) \qquad \text{(Equation 6)}.$$

Therefore, the state update module 40 is preferably adapted to update the traversal index, i, by adding, or subtracting D, to or from, i, respectively.

It will be appreciated by those ordinarily skilled in the art that equation 6 can also be used with a fixed constant.

In the example of equation 6, D is preferably an integer of the structure N/b+C, where GCD(D, N)=1 (GCD being the greatest common divisor), b is preferably a positive small divider of N (for example, smaller than 5) and C is preferably a very small or a very large constant (for example, smaller than 5 or greater than N−5).

Updating of the pseudo-random indices of the reduced state 46 is now described in more detail.

The pseudo-random index/indices (PRI) are preferably updated in accordance with one or more of the following methods.

The first method preferably includes updating the PRI of the reduced state as a function of one or more of the DCs 48 as well as other entries of the table. The update DC module 44 is preferably adapted to update the PRI of the reduced state 46 as a function of one or more of the DCs 48 such that at least one of the following criteria is fulfilled:

(a) one or more of the dynamic constants 48 is typically in the range 0 to N−1, where N is the size of the table to which the pseudo-random index points;

(b) one or more of the dynamic constants 48 is typically XORed to a temporal result of the update;

(c) one or more of the dynamic constants 48 is typically added to, or subtracted from, a temporal result of the update; and (d) one or more of the dynamic constants 48 is typically multiplied with a temporal result of the update.

An example of applying the above criteria is:

$$j = (D_3 * j) + (D_1 \mathrm{XOR} S[i]) + D_2 (\bmod N). \qquad \text{(Equation 7)}$$

where $D_1$, $D_2$ and $D_3$ are dynamic constants.

The second method includes assigning "forbidden" or "undesirable" values to the PRI, which are described in more detail, below.

By way of introduction, with most of the prior art table-shuffle stream ciphers, the pseudo-random indices are updated through functions of a certain class. The class usually includes functions that for every original value (j'), and for every target value (j"), the index j' may be updated into j", namely the content of the tables send j' to j". Moreover, for every original index j', when taking random tables, the distribution of j" is more or less uniform over the possible indices. Many weaknesses of table-shuffle stream ciphers stem from scenarios where the index j progresses in certain ways, for example, but not limited to, staying in place (j"=j'), making small steps back and forth (|j"−j'|<d for small values of d) and progressing in accordance with i(|(j"−j')−(i"−i')|<d for small values of d, i' being the value of i when j=j', i" being the value of i when j=j").

Therefore, in accordance with a preferred embodiment of the present invention, a new value of j, namely, j", is preferably determined such that certain j values are avoided based on j'. Namely, there are generally j" values that are not reached from j', regardless of the content of the tables. Therefore, the state update module 40 is preferably adapted such that the new value of the pseudo-random index of the reduced state is generally determined to exclude, one or more "undesirable" values of the N possible values of the pseudo-random index.

In accordance with an alternative preferred embodiment of the present invention, the distribution of the index j" given the previous index j' is preferably biased away from "undesirable" values, namely the values are not totally forbidden, but are less likely to be selected.

The forbidden or undesirable values, j", are typically different for each j'. However, some or all of the forbidden or undesirable values j" may be the same for two or more j' values.

By way of a non-limiting example, the pseudo-random index progression function having the structure:

$$j=j+g(\ldots) \qquad \text{(Equation 8)},$$

where g is an arbitrary function, is typically strengthened by performing the following two steps. First, a restricting function f is preferably employed that is defined from $\{0, \ldots, N_{x-1}\}$ to $\{0, \ldots, N_{x-1}\}$ that is a non-onto function, namely there is at least one z" for which there is no z' for which f(z')=z"). Second the function g( . . . ) is preferably replaced with the function j=j+f(g( . . . )).

In the above example, in order to avoid calculation of the f function for every state update, it is preferable to create, in advance, a table of size N with the value f(x) in position x for each position in the table. Using such a table allows the use of arbitrary f functions, whereby f actually becomes an S-Box.

In accordance with the most preferred embodiment of the present invention, f does not preferably map onto any of the following undesirable values:
  (a) small values (for example, but not limited to zero to 5);
  (b) negative small values (for example, but not limited to N−5 to N−1, in other words values of mod N that are equivalent to negative small values of N]; and
  (c) numbers larger than N/5 that have a common divisor with N (for example, but not limited to N/2, N/3, 2N/3, N/4, 3N/4)

Updating of the tables is now described in more detail.

The tables are typically updated in a way that is similar to table-shuffle stream ciphers which do, not employ dynamic constants, by permuting the refresh set, for example, but not limited to, swapping the entry associated with the new value of the traversal index with the entry associated with the new value of the pseudo-random index.

Output word generation is now described in more detail below.

The output word is preferably calculated in accordance with one or more of the following methods.

In accordance with a first preferred method, the calculation of the output word is preferably a function of one or more of the dynamic constants 48 and the new value of the traversal index and the new value of the pseudo-random index. Therefore, the output word module 42 is preferably adapted to generate the output words as a function of one or more of the DCs 48. The generation of the output words typically includes fulfilling at least one of the following:
  (a) one or more of the dynamic constants 48 is in the range 0 to N−1, where N is the size of at least one of the state tables;
  (b) one or more of the dynamic constants 48 is typically XORed to a temporal result of the output word generation calculation;
  (c) one or more of the dynamic constants 48 is typically added to a temporal result of the output word generation calculation; and
  (d) one or more of the dynamic constants 48 is typically multiplied with a temporal result of the output word generation calculation.

An example of applying the above criteria is to preferably employ the following function for calculating the output word:

$$S[(D_3*j)+(D_1 \text{XOR} S[i])+S[j]]+D_2 \qquad \text{(Equation 9)},$$

where $D_1$, $D_2$ and $D_3$ are dynamic constants.

In accordance with a second preferred method, the output word module 42 preferably selects the output word through the following function:

$$f(S[G(f(j), f(S[f(i)]), f(S[f(i)]), \ldots f(S[f(i)]), f(S[f(i)]),$$
$$f(S[f(j)]), \ldots, f(S[f(j)]))]) \qquad \text{(Equation 10)},$$

where G is typically an XOR or addition modulus 256 and each instance of the function f is typically a function from the following list:
  f(x)=C XOR x;
  f(x)=C+x, where C is not equal to zero;
  f(x)=C*x, where C is not equal to one;
where each of the C's is either a constant or a dynamic constant, some of the C's being identical or different, and each of the instances of the functions f preferably being a different function.

A more general function for traversal indices and pseudo-random indices $i_1, \ldots, i_d$, is:

$$f(S[G(f(i_1), f(S[f(i_1)]), f(S[f(i_1)]), \ldots, f(S[f(i_1)]), \qquad \text{(Equation 11)}$$
$$f(i_2), f(S[f(i_2)]), f(S[f(i_2)]), \ldots, f(S[f(i_2)]), \ldots$$
$$f(i_d), f(S[f(i_d)]), f(S[f(i_d)]), \ldots, f(S[f(i_d)]),)]),$$

where preferably for every x the number of inputs to G of the type $f(S[f(i_x)])$ is arbitrary.

The update DC module 44 is now described in more detail below.

The update DC module 44 preferably updates each of the DCs 48 as a function of the extended state, namely the tables, the indices of the state 46 and one or more of the other DCs 48.

In a preferred embodiment of the present invention at least one of the DCs 48, for example a dynamic constant $DC_1$, is updated through the function:

$$DC_1 = C + S[S[DC_2] + S[DC_3] \bmod N] \qquad \text{(Equation 12)},$$

where C is a constant, S is a state table of size N, and $DC_2$ and $DC_3$ are other dynamic constants.

A more general function is:

$$DC_1 = f(S[G(f(S[f(DC_2)]), f(S[f(DC_3)]), \ldots, f(S[f(DC_d)]),)]) \qquad \text{(Equation 13)},$$

where $DC_2, DC_3, \ldots, DC_d$ are dynamic constants, G is preferably an XOR or addition modulus 256, and each instance of the function f is preferably a masking function, typically one of the following:

$f(x)=C \text{XOR} x;$ $f(x)=C+x$, where $C$ is not equal to zero;

$f(x)=C*x$, where $C$ is not equal to 1;

where each of the C's is a constant, some of the C's may be identical, and each of the instances of the functions f is preferably a different masking function.

The initialization module 38 is now described in more detail below.

The initialization module 38 preferably translates the IV 52 and the key 50 into an extended internal state, namely tables and indices of the state 46 and the DCs 48.

As part of the initialization process, the initialization module 38 typically employs a set of the dynamic constants 48 so that the initialization of the extended state is a function of one or more of the dynamic constants 48. It should be noted that the dynamic constants used by the initialization module 38, do not necessarily need to be the same as the DCs 48 used during the keystream 54 generation, namely, in order to update the state 46 and generate the output words.

In accordance with a preferred embodiment of the present invention, the initialization module 38 typically initializes at least one of the tables through an initialization method that employs two nested loops, an external loop and an internal loop, in the following manner.

First, the total number of iterations is preferably at least the size of the initialized table. Namely, if the external loop is repeated $C_1$ times and the internal loop is repeated $C_2$ times and the initialized table has N entries, then $C_1*C_2$ is greater than or equal to N.

Second, in the external loop, the dynamic constants 48 typically are updated.

Third, in the internal loop one or more table entries are typically updated in each round, generally using at least one DC 48 updated in the external loop, for the update.

In accordance with a preferred embodiment of the present invention the initialization method is implemented as follows:

For x=0 to $C_1-1$ $$DC=\text{InitialUpdate}DC(\ ) \quad \text{(Equation 14)},$$

For y=0 to $C_2-1$ $$\text{Indices, Table}=\text{InitialUpdateState}(\ ) \quad \text{(Equation 15)},$$

where x and y are used as counters for the number of times the external and internal loops are iterated, respectively.

The "InitialUpdateState" function of the internal loop updates the state 46, preferably by: updating the indices using the key 50; locating the refresh set; and permuting the values of the refresh set in a predetermined manner.

The "InitialUpdateDC" function of the external loop updates the DCs 48 in a way that is not necessarily similar to the update DC module 44.

In accordance with the most preferred embodiment of the present invention, the "InitialUpdateState" function of the internal loop is typically a function of the key 50, one or more indices, one or more tables and one or more of the DCs 48.

The "InitialUpdateState" function typically updates one or more of the indices using more than one permutation entry, for example, but not limited to the following function:

$$i=i+1 \quad \text{(Equation 16)},$$

$$j=j+(DC_0XORS[i])+$$

$$DC_1XORS[i+64])+$$

$$DC_2XORS[i+128])+$$

$$DC_3XORK[i \bmod |K|]) \quad \text{(Equation 17)},$$

Swap(S[i], S[j]).

In accordance with the most preferred embodiment of the present invention the "InitialUpdateDC" function of the external loop is preferably a function of the IV 52 and the minimum of N and $C_2$ multiplied by x, where x is the current number of iterations made by the external loop.

The "InitialUpdateDC" function typically updates one or more of the dynamic constants 48 in the following way (z representing $C_2$ multiplied by x):

$$DC_1=S[S[DC_2\%z]+S[DC_3\%z]+S[IV\_WORD]] \quad \text{(Equation 18)},$$

where b is a constant, $DC_2$ and $DC_3$ are dynamic constants, IV_WORD is the IV 52 and z indicates the size of the table prefix that has "good" randomness and thus can be used for adding randomness to the DC. When z=0, a different function is optionally used to calculate the new value of $DC_1$.

It will be understood that the system according to the present invention may be a suitably programmed processor. Likewise, the invention contemplates software being readable by a processor for executing the method of the invention. The invention further contemplates a machine-readable memory tangibly embodying a program of instructions executable by the machine for executing the method of the invention.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

What is claimed is:

1. A table-shuffle stream cipher system comprising:
   physical computing machinery including:
   a pseudo-random number generator adapted to maintain at least one stream cipher table having N entries, at least one traversal index and at least one pseudo-random index;
   a state update module adapted to update a state of the at least one stream cipher table by:
   determining a new value of the traversal index such that the new value of the traversal index is a function of a constant integer having an absolute value greater than one, the new value of the traversal index being independent of the pseudo-random index and the entries of the at least one stream cipher table;
   determining a new value of the pseudo random index based upon at least one of the entries of the at least one stream cipher table; and
   swapping the entry associated with the new value of the traversal index with the entry associated with the new value of the pseudo-random index;
   and an output word module adapted to generate an output word as a function of the new value of the traversal index and the new value of the pseudo-random index.

2. The system according to claim 1, wherein the state update module is adapted to determine a new value of the at least one traversal index by adding, or subtracting, the constant integer to, or from, the at least one traversal index, respectively.

3. The system according to claim 1, wherein the constant is an integer which is determined such that the constant equals N divided by the sum of b and C, wherein:
- a greatest common divisor of the at least one dynamic constant and N is 1;
- b is less than 5 and is a positive divider of N; and
- C is one of less than 5 or greater than N−5.

4. A table-shuffle stream cipher system comprising:
physical computing machinery including:
- a pseudo-random number generator adapted to maintain at least one stream cipher table having N entries, one traversal index and at least one pseudo-random index;
- a state update module adapted to update a state of the at least one stream cipher table by:
- determining a new value of the traversal index, the new value of the traversal index being independent of the pseudo-random index and the entries of the at least one stream cipher table;
- determining a new value of the pseudo-random index based upon at least one of the entries of the at least one stream cipher table such that the new value of the pseudo-random index is at least biased away from at least one undesirable value of the N possible values of the pseudo-random index; and
- swapping the entry associated with the new value of the traversal index with the entry associated with the new value of the pseudo-random index;
- and an output word module adapted to generate an output word as a function of the new value of the traversal index and the new value of the pseudo-random index.

5. The system according to claim 4, wherein the state update module is adapted to determine the new value of the pseudo-random index so that the new value of the pseudo-random index excludes the at least one undesirable value.

6. A method for operating a table-shuffle stream cipher comprising:
- maintaining at least one stream cipher table having N entries, at least one traversal index and at least one pseudo-random index;
- updating a state of the at least one stream cipher table by:
- determining a new value of the traversal index such that the new value of the traversal index is a function of a constant integer having an absolute value greater than one, the new value of the traversal index being independent of the pseudo-random index and the entries of the at least one stream cipher table;
- determining a new value of the pseudo random index based upon at least one of the entries of the at least one stream cipher table; and
- swapping the entry associated with the new value of the traversal index with the entry associated with the new value of the pseudo-random index;
- and generating an output word as a function of the new value of the traversal index and the new value of the pseudo-random index.

7. A method for operating a table-shuffle stream cipher comprising:
- maintaining at least one stream cipher table having N entries, one traversal index and at least one pseudo-random index;
- updating a state of the at least one stream cipher table by:
- determining a new value of the traversal index, the new value of the traversal index being independent of the pseudo-random index and the entries of the at least one stream cipher table;
- determining a new value of the pseudo-random index based upon at least one of the entries of the at least one stream cipher table such that the new value of the pseudo-random index is at least biased away from at least one undesirable value of N possible values of the pseudo-random index; and
- swapping the entry associated with the new value of the traversal index with the entry associated with the new value of the pseudo-random index; and
- generating an output word as a function of the new value of the traversal index and the new value of the pseudo-random index.

* * * * *